Jan. 22, 1957     E. S. BURROWS     2,778,025
VEIL CONSTRUCTION
Filed Nov. 24, 1954
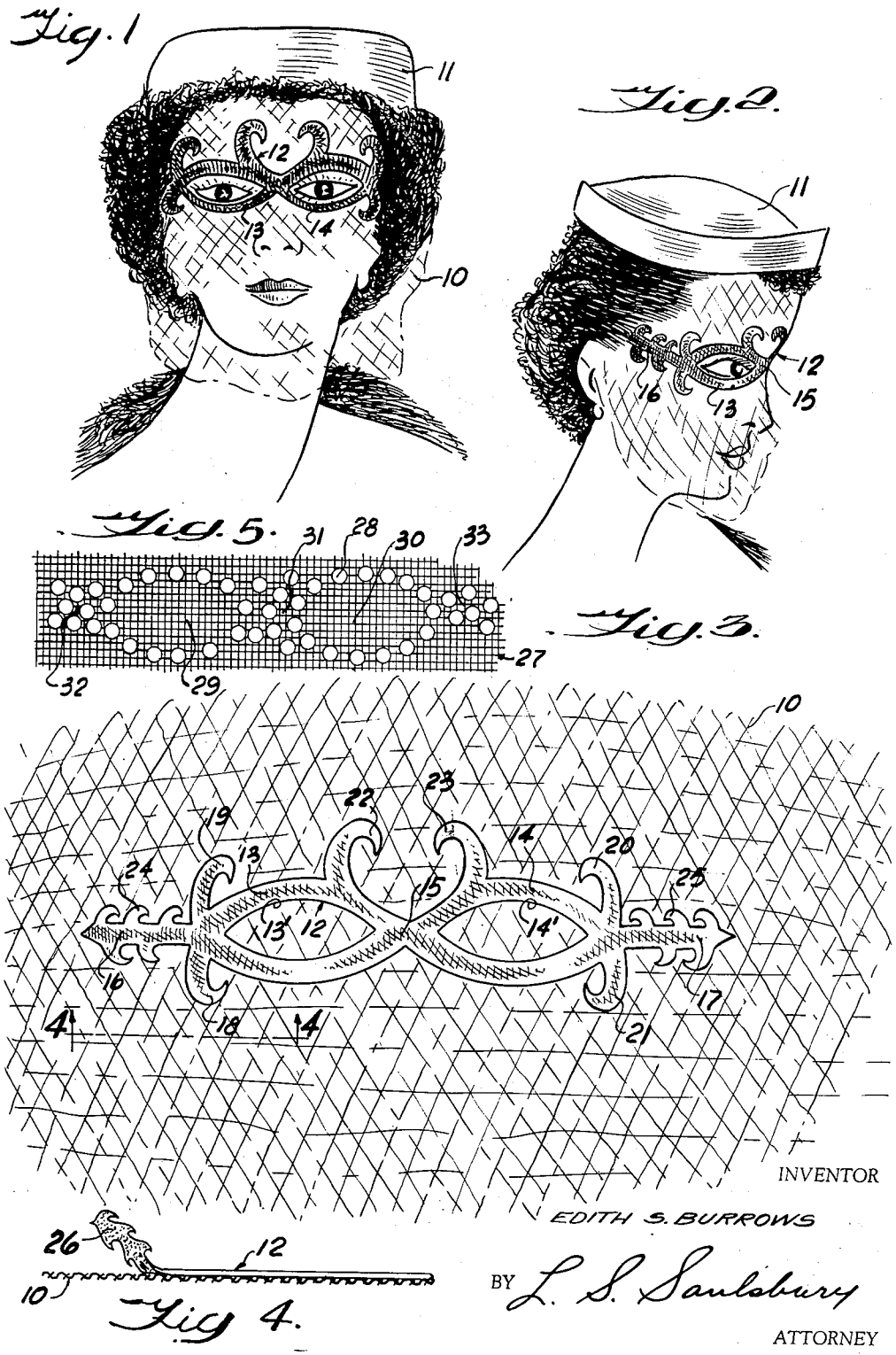
INVENTOR
EDITH S. BURROWS
BY L. S. Saulsbury
ATTORNEY

United States Patent Office 2,778,025
Patented Jan. 22, 1957

2,778,025

VEIL CONSTRUCTION

Edith S. Burrows, Washington, D. C., assignor of one-fourth to Laforest S. Saulsbury, New York, N. Y.

Application November 24, 1954, Serial No. 470,984

2 Claims. (Cl. 2—207)

This invention relates to women's veils.

It is an object of this invention to provide a veil having a pattern conforming generally to the outline of eye glasses so as to cover and conceal frames and edges thereof.

It is another object of the invention to provide a veil adapted to be worn over the eyes with a pattern outlining the eyes whereby to lend allure to the eyes of the wearer and to give a pleasing and new styling effect.

It is another object of the present invention to provide a veil pattern with oval portions that overlie and surround the eyes of the wearer and which are joined together by a portion that will cover the nose piece of the glasses and which have on their outer ends extensions that cover the temple pieces.

It is another object of the invention to provide means for girls and women wearing eye glasses by which their self-consciousness resulting from the wearing of eye glasses will be minimized and which will prevent the eye glasses from detracting from the appearance of the wearer.

Other objects of the invention are to provide a veil construction having the above objects in mind which will be of simple construction, inexpensive to manufacture, durable, of pleasing appearance and effective in use.

For other objects and a better understanding of the invention, reference may be had to the following detailed description taken in connection with the accompanying drawing, in which:

Figure 1 is a front face perspective view of the veil extended over the face of a wearer and showing the full frontal appearance of the cover pattern for the eye glasses;

Fig. 2 is a side elevational view of the veil upon the wearer and illustrating the manner in which the temple or ear pieces are covered by the veil;

Fig. 3 is an enlarged fragmentary plan view of the veil and of the eye outline pattern for covering the eye glasses shown in full;

Fig. 4 is a sectional view of the veil looking upon the side edge of one end of the pattern and with the pattern being lifted to show the manner in which it is connected to the veil; and Fig. 5 is a fragmentary view of a veil bearing a modified form of the outline pattern for the glasses wherein the pattern is formed of individual sequins separately adhered to the veil.

Referring now particularly to Figs. 1 to 4, 10 represents an area of veiling material formed of thin light weight threads and intersecting and connected with one another at spaced intervals to provide a mesh characteristic of such material. The veil threads can be made of either natural or synthetic substance. In fact, the veil can be constructed according to any of the typical and well known methods of constructing veils and with the spaces formed between the threads being of varying shapes but sufficiently large to permit the eyes of the wearer of the veil to see through them. The veil will be worn over the face of the wearer in the manner shown in Figs. 1 and 2 and either tied at the back of the head in the usual manner, or, if desired, the veil may be suspended from a hat 11, on the head of the wearer and left free at the bottom and tied in some simple manner to prevent movement in front of the face and eyes.

According to the present invention, there is arranged upon the veiling material an outline pattern 12, conforming generally to the shape of eye glasses. This pattern is formed of material of greater rigidity than the veiling material consists of two oval portions 13 and 14 that are joined by an intermediate or interconnecting portion 15. The oval portions are adapted to extend in such a manner as to cover the frames or edges of eye glasses and the interconnecting portion 15 is designed to cover the connecting bridge of glasses that extends over the nose of the wearer. The oval portion 13 has an eye opening 13' and the oval portion 14 has an eye opening 14' through which the wearer of the veil and of the glasses may see.

On the outer end of the oval portion 13 is a temple cover portion 16 to extend over the ear or temple piece of the eye glasses at the one side of the head. On the outer end of the oval portion 14 is a temple cover portion 17 for covering the ear piece at that side of the head. The pattern is sufficiently self-supporting to hold the shape of its opening yet flexible enough to permit the extension of the temple portions over the ear pieces of the glasses.

For decorative purposes and to detract further from the eye glasses, the oval portion 13 has opposed horned shape portions 18 and 19, and the oval portion 14 has opposed horned shape portions 20 and 21. On the oval portions 13 and 14 and projecting upwardly therefrom are opposing horned shape portions 22 and 23. The temple portions 16 and 17 have respectively horned portions 24 and 25. All of these horned portions lend further allure to the pattern. The horned portions are so shaped that they engage the top and bottom edges of the glasses upon vertical movement of the veil thereover and thereby tend to prevent the disalignment of the pattern with respect to the glasses.

These portions forming the outline pattern 12 may have different shapes but generally are such as to cover the general outline of the eye glasses on the wearer. This pattern can be worked into the mesh by weaving or other means and designed to integrally fill the spaces of the mesh to make out the pattern shape.

The present pattern shown in Figs. 3 and 4 is formed of separate material cut or woven into shape onto decorative elements which may be stamped or worked and the pattern secured to the veiling either by sewing or as illustrated or by adhesive 26 provided on the underside of the pattern 12. If the veil and pattern materials are formed of plastic, they may be secured by the application of pressure and heat.

In Fig. 5, there is shown a modified form of the invention, utilizing a veil of as lightly different shape mesh as indicated at 27 and on which there is connected an outline of sequins 28 arranged to provide, when taken with the mesh material, oval portions 29 and 30, a connecting portion 31 adapted to overlie the bridge of the eye glasses and temple portions 32 and 33. The wearer sees through the oval portions 29 and 30.

It should now be apparent that a veil of this construction will detract the viewer from the glasses of the wearer. It will further be apparent that this pattern conforms generally to the outline of eye glasses and which will reduce the transparency of the veil over the eye area of the face of the wearer and will cover the frame and edges of the glasses to render them inconspicuous. Many persons now required to wear eye glasses because of defective vision can now wear them without feeling conspicuous. It will be apparent that the present veil having the eye glass pattern considerably minimizes the showing of the eye glasses. It will further be apparent that many different designs and configurations may be worked out from the point of view of attractiveness or fashion without departing from the general outline or pattern above set forth and shown.

While various changes may be made in the detail construction, it shall be understood that such changes shall be within the spirit and scope of the present invention, as defined by the appended claims.

What is claimed is:

1. A veil formed of open mesh material and a pattern formed of material of greater rigidity than the veil material attached to the mash material centrally of the veil and spaced inwardly from both sides thereof and said pattern adapted to overlie the rims and the ear pieces of the glasses on a wearer's face and comprising two spaced oval portions having view openings adapted to be aligned with the lenses of the glasses and through which the eyes may look, an interconnecting portion extending between the two oval portions and adapted to overlie the bridge of the glasses and temple cover portions extending respectively from the respective outer ends of the oval portions and adapted to overlie the ear pieces of the glasses, said pattern being sufficiently self-supporting to hold the shape of its view openings in front of the lenses of the glasses yet flexible enough to permit the extension of the temple cover portions over the ear pieces of the glasses upon the veil being shaped or tensioned about the face.

2. A veil as defined in claim 1 and horned projections extending above and below the oval portions, said horned projections being adapted to engage the top and bottom edges of the glasses upon vertical movement of the veil thereover, whereby the disalignment of the pattern with respect to the glasses may be prevented.

References Cited in the file of this patent

UNITED STATES PATENTS

| D. 44,368 | Hacker | July 22, 1913 |
| D. 44,990 | Van Raalte | Dec. 2, 1913 |
| 780,616 | Palmer | Jan. 24, 1904 |
| 1,671,889 | Dorros | May 29, 1928 |
| 2,171,311 | Moses | Aug. 29, 1939 |

FOREIGN PATENTS

| 12,067 | Great Britain | July 16, 1891 |
| 369,406 | France | Nov. 10, 1906 |